United States Patent
Venkataraman et al.

(10) Patent No.: US 10,146,587 B2
(45) Date of Patent: Dec. 4, 2018

(54) FUTURE LOCKING OF RESOURCES

(71) Applicant: Accenture Global Services Limited, Dublin (IE)

(72) Inventors: Ramanathan Venkataraman, Chennai (IN); Pramod Nanadikar, Mumbai (IN); Badrinarayanan Vasudevan, Mumbai (IN); Nandita Kshirsagar, Mumbai (IN); Priya Joshi, Mumbai (IN)

(73) Assignee: Accenture Global Services Limited, Dublin (IE)

(*) Notice: Subject to any disclaimer, the term of this patent is extended or adjusted under 35 U.S.C. 154(b) by 537 days.

(21) Appl. No.: 14/732,168

(22) Filed: Jun. 5, 2015

(65) Prior Publication Data

US 2015/0269003 A1    Sep. 24, 2015

Related U.S. Application Data

(63) Continuation of application No. 11/717,548, filed on Mar. 13, 2007.

(30) Foreign Application Priority Data

Aug. 24, 2006    (IN) .................... 1334/MUM/1006

(51) Int. Cl.
*G06F 9/50*    (2006.01)
*H04L 12/66*    (2006.01)
(Continued)

(52) U.S. Cl.
CPC .......... *G06F 9/5055* (2013.01); *G06F 9/5022* (2013.01); *G06F 17/30362* (2013.01);
(Continued)

(58) Field of Classification Search
CPC ........ G06Q 40/00; G06Q 10/02; G06Q 10/06; H04L 67/10; H04L 5/0057;
(Continued)

(56) References Cited

U.S. PATENT DOCUMENTS

| | | |
|---|---|---|
| 5,711,010 A | 1/1998 | Naddell et al. |
| 5,867,494 A | 2/1999 | Krishnaswamy et al. |

(Continued)

FOREIGN PATENT DOCUMENTS

| | | |
|---|---|---|
| WO | WO 2000073955 | 12/2000 |
| WO | WO 2001011523 | 2/2001 |
| WO | WO 2001073750 | 10/2001 |

OTHER PUBLICATIONS

Clarke and Wright, "Scheduling vehicles from a central depot to a number of delivery points," Operations Res., 12:568-581 (1964).

(Continued)

*Primary Examiner* — Jeffrey R Swearingen
(74) *Attorney, Agent, or Firm* — Fish & Richardson P.C.

(57) ABSTRACT

A system for allocating resources to demand requests is set forth. The system is configured to identify a set of resource requirements based on a demand request. The system is also configured to choose a resource that satisfies at least one of the identified resource requirements. The system is further configured to allocate the selected resource to the demand request based on whether a client can satisfy a locking prerequisite associated with the selected resource.

21 Claims, 7 Drawing Sheets

(51) Int. Cl.
*H04L 12/911* (2013.01)
*H04L 12/927* (2013.01)
*H04L 29/08* (2006.01)
*G06F 17/30* (2006.01)
*H04L 29/06* (2006.01)

(52) U.S. Cl.
CPC .............. *H04L 12/66* (2013.01); *H04L 47/70* (2013.01); *H04L 47/781* (2013.01); *H04L 47/808* (2013.01); *H04L 67/306* (2013.01); *H04L 67/322* (2013.01); *H04L 67/42* (2013.01)

(58) Field of Classification Search
CPC ......... H04L 2012/5678; H04L 41/0803; H04L 47/72; H04L 5/0055; G06F 9/505; H04W 4/24
USPC .......................................................... 709/226
See application file for complete search history.

(56) References Cited

U.S. PATENT DOCUMENTS

| | | | |
|---|---|---|---|
| 5,956,712 A | 9/1999 | Bennett et al. | |
| 5,991,739 A | 11/1999 | Cupps et al. | |
| 5,995,805 A | 11/1999 | Ogasawara et al. | |
| 6,067,301 A | 5/2000 | Aatresh | |
| 6,112,243 A | 8/2000 | Downs et al. | |
| 6,195,691 B1 | 2/2001 | Brown | |
| 6,253,236 B1 | 6/2001 | Troxel et al. | |
| 6,259,913 B1 | 7/2001 | Noreils et al. | |
| 6,401,085 B1 | 6/2002 | Gershman et al. | |
| 6,519,571 B1 | 2/2003 | Guheen et al. | |
| 6,526,449 B1 | 2/2003 | Philyaw et al. | |
| 6,535,880 B1 | 3/2003 | Musgrove et al. | |
| 6,546,374 B1 | 4/2003 | Esposito et al. | |
| 6,587,838 B1 | 7/2003 | Esposito et al. | |
| 6,684,193 B1 | 1/2004 | Chavez et al. | |
| 6,690,668 B1 | 2/2004 | Szczepanek et al. | |
| 6,697,824 B1 | 2/2004 | Bowman-Amuah | |
| 6,751,455 B1 | 6/2004 | Acampora | |
| 6,754,714 B1 | 6/2004 | Chebrolu | |
| 6,801,228 B2 | 10/2004 | Kargman | |
| 6,845,361 B1 | 1/2005 | Dowling | |
| 6,901,397 B1 | 5/2005 | Moldenhauer et al. | |
| 6,903,723 B1 | 6/2005 | Forest | |
| 6,920,431 B2 | 7/2005 | Showghi et al. | |
| 6,920,454 B1 | 7/2005 | Chan | |
| 6,922,567 B1 | 7/2005 | Rydbeck | |
| 6,959,283 B1 | 10/2005 | White | |
| 6,961,778 B2 | 11/2005 | Swartz et al. | |
| 6,980,962 B1 | 12/2005 | Arganbright et al. | |
| 7,003,500 B1 | 2/2006 | Driessen | |
| 7,010,721 B2 | 3/2006 | Vincent | |
| 7,047,299 B1 | 5/2006 | Curtis | |
| 7,069,235 B1 | 6/2006 | Postelnik et al. | |
| 7,072,856 B1 | 7/2006 | Nachom | |
| 7,139,578 B2 | 11/2006 | An | |
| 7,174,379 B2 | 2/2007 | Agarwal et al. | |
| 7,197,326 B2 | 3/2007 | Acampora | |
| 7,219,347 B1 | 5/2007 | Waddington | |
| 7,313,557 B1 | 12/2007 | Noveck | |
| 7,398,525 B2 | 7/2008 | Leymann et al. | |
| 7,526,765 B2 | 4/2009 | Lin et al. | |
| 7,979,859 B2 * | 7/2011 | Li .................... | H04L 41/0806 709/224 |
| 8,185,905 B2 * | 5/2012 | Cook .................. | G06F 9/5044 718/104 |
| 2001/0039581 A1 | 11/2001 | Deng et al. | |
| 2002/0004832 A1 | 1/2002 | Yoon et al. | |
| 2002/0026398 A1 | 2/2002 | Sheth | |
| 2002/0038261 A1 | 3/2002 | Kargman et al. | |
| 2002/0049644 A1 | 4/2002 | Kargman | |
| 2002/0055865 A1 | 5/2002 | Hammann | |
| 2002/0067827 A1 | 6/2002 | Kargman | |
| 2002/0161891 A1 | 10/2002 | Higuchi et al. | |
| 2002/0188492 A1 | 12/2002 | Borton | |
| 2003/0005457 A1 | 1/2003 | Faibish et al. | |
| 2003/0083919 A1 | 5/2003 | Hammann | |
| 2004/0111321 A1 | 6/2004 | Kargman | |
| 2004/0158494 A1 | 8/2004 | Suthar | |
| 2004/0203832 A1 | 10/2004 | An | |
| 2004/0215780 A1 | 10/2004 | Kawato | |
| 2004/0267616 A1 | 12/2004 | Kargman | |
| 2005/0015256 A1 | 1/2005 | Kargman | |
| 2005/0021407 A1 | 1/2005 | Kargman | |
| 2005/0045728 A1 | 3/2005 | Kargman | |
| 2005/0049922 A1 | 3/2005 | Kargman | |
| 2005/0071241 A1 | 3/2005 | Flockhart et al. | |
| 2005/0071593 A1 | 3/2005 | Vincent | |
| 2005/0108097 A1 | 5/2005 | McAleenan | |
| 2005/0114860 A1 | 5/2005 | Lin et al. | |
| 2005/0125278 A1 | 6/2005 | Vajracharya et al. | |
| 2005/0131898 A1 | 6/2005 | Fatula | |
| 2005/0131899 A1 | 6/2005 | Dvorkin et al. | |
| 2005/0172291 A1 | 8/2005 | Das et al. | |
| 2005/0182856 A1 | 8/2005 | McKnett | |
| 2005/0188088 A1 | 8/2005 | Fellenstein et al. | |
| 2005/0209914 A1 | 9/2005 | Nguyen et al. | |
| 2005/0220009 A1 | 10/2005 | Kargman | |
| 2005/0267811 A1 | 12/2005 | Almblad | |
| 2006/0010037 A1 | 1/2006 | Angert et al. | |
| 2006/0041482 A1 | 2/2006 | Awiszus et al. | |
| 2006/0080163 A1 | 4/2006 | Sutcliffe | |
| 2006/0080165 A1 | 4/2006 | Sutcliffe | |
| 2006/0122896 A1 | 6/2006 | Parsley | |
| 2006/0123098 A1 | 6/2006 | Asher et al. | |
| 2006/0149865 A1 | 7/2006 | Kirstein | |
| 2006/0155753 A1 | 7/2006 | Asher et al. | |
| 2006/0155770 A1 | 7/2006 | Asher et al. | |
| 2006/0173754 A1 | 8/2006 | Burton et al. | |
| 2006/0178943 A1 | 8/2006 | Rollinson et al. | |
| 2006/0178951 A1 | 8/2006 | Rund, III | |
| 2006/0224496 A1 | 10/2006 | Sandholm et al. | |
| 2006/0271700 A1 | 11/2006 | Kawai et al. | |
| 2006/0282400 A1 | 12/2006 | Kalavacharla et al. | |
| 2006/0294239 A1 | 12/2006 | Ishida | |
| 2007/0079073 A1 | 4/2007 | Rosenbluth et al. | |
| 2007/0094325 A1 | 4/2007 | Ih et al. | |
| 2007/0127527 A1 | 6/2007 | Dan et al. | |
| 2007/0165525 A1 | 7/2007 | Kageyama | |
| 2007/0174101 A1 | 7/2007 | Li et al. | |
| 2007/0299804 A1 | 12/2007 | Liu et al. | |
| 2008/0052397 A1 | 2/2008 | Venkataraman et al. | |
| 2008/0235065 A1 | 9/2008 | Dan et al. | |
| 2008/0263549 A1 | 10/2008 | Walker | |

OTHER PUBLICATIONS

Edwards et al., "A Methodology and Implementation for Analytic Modeling in Electronic Commerce Applications," Electronic Commerce Technologies, Lecture notes in computer science, 2040:148-157, 2001.

Medji, Chpt 5 "Network of Queues," Stochastic Models in Queuing Theory, Elsevier Academic Press, 2002, 35 pages.

Mingozzi et al., "Dynamic programming strategies and reduction techniques for the traveling salesman problem with time windows and precedence constraints," Operations Research, 45:365-377 (1997).

Munkres, "Algorithms for the Assignment and Transportation Problems," J Soc Indust Appl Math., 5(1):32-38 (Mar. 1957).

Sudhir Kumnar Jha, Resume, http://www.freelancebbs.com/fbb/freelanceradDD10358.html , Oct. 5, 2004.

* cited by examiner

FUTURE LOCKING OF RESOURCES

This application claims priority under 35 U.S.C. § 119 to Indian Patent Application No. 1334/MUM/1006 filed Aug. 24, 2006, the entire content of which is hereby incorporated by reference.

FIELD OF THE INVENTION

The technical field relates to resource allocation, and in particular, to allocating resources based on resource requirements determined from a demand request.

RELATED ART

Business centers have seen explosive growth over the last several years, for example, from having no available resources to tens of thousands of resources. This growth can span across multiple locations, facilities, skills and employment pyramid levels. The pace of growth and its resulting complexity requires planning, effective management of staffing, and knowledgeable utilization of resources. The demand for resources at these business centers is typically lumpy in nature and has extremely short lead times for fulfillment. Currently, there is a problem in managing and effectively using resources in businesses employing complex categorizations of resources.

SUMMARY OF THE INVENTION

A system for allocating resources to demand requests is set forth. The system includes a resource requirement processor, which may identify a set of resource requirements associated with a demand request. The system also includes a resource selector. The resource selector may select a resource that satisfies at least one of the resource requirements from the set of resource requirements identified by the resource requirement processor. The system further includes a communication processor that is capable of receiving a response from a client indicating whether a client can satisfy a locking prerequisite associated with the selected resource. The system additionally includes a resource allocation processor that allocates the selected resource to the demand request based on the response received by the communication processor.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
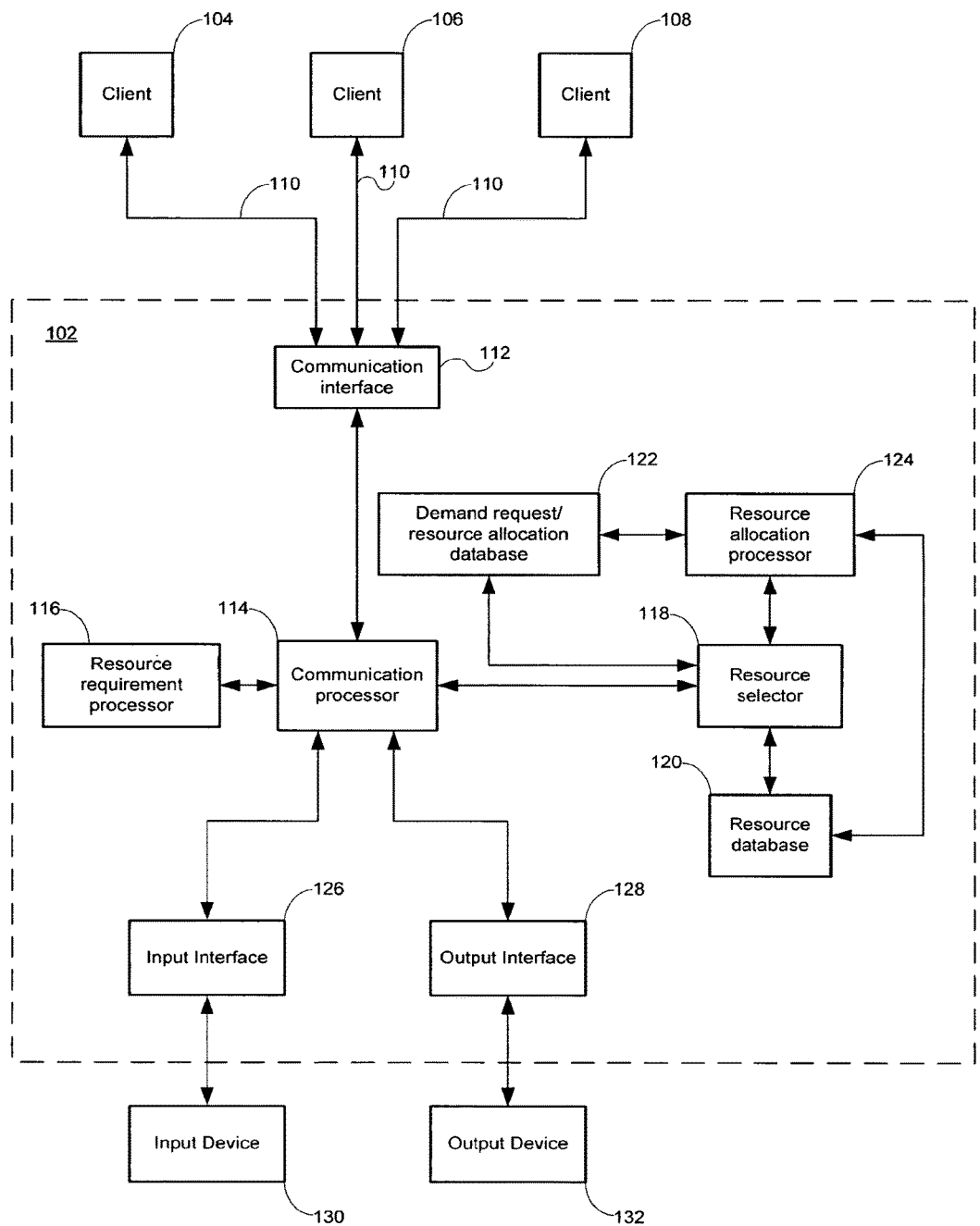
FIG. 1 is a block diagram of an example of a system for allocating resources to a demand request.

As shown in FIG. 1, a system for assigning resources to demand requests 102 may include a communication interface 112 coupled with a communication processor 114. The system 102 may also include a resource requirement processor 116 and a resource selector 118 coupled with the communication processor 114. A demand request/resource allocation database 122 and a resource allocation processor 124 may be coupled with the resource selector 118. A resource database 120 is also coupled with the resource selector 118.

In one embodiment, the system 102 includes an input interface 126 and an output interface 128 coupled with the communication processor 114. An input device 130 is coupled with the input interface 126 and an output device 132 is coupled with the output interface 128.

As shown in FIG. 1, clients 104/106/108 send demand requests to the system 102 using a communication link 110. The communication link 110 may be a wired or wireless link, such as a packet-network, a circuit-switched network, or a combination thereof. Clients 104/106/108 may communicate directly with the system 102, such as using Ethernet, or indirectly, such as using a modem to communicate with an Internet service provider (ISP), which then communicates with the system 102. The system 102 may reside on any one of clients 104/106/108. The system 102 may also reside on all three of the clients 104/106/108.

A client 104 communicates with the system for assigning resources to demand requests 102 using a communication interface 112. The communication interface 112 may be a serial or parallel interface. The communication interface 112 may also be a Universal Serial Bus (USB) interface. In another embodiment, the communication interface 112 is an Ethernet interface. In yet another embodiment, the communication interface 112 is an IEEE 1394 (FireWire) interface. In a further embodiment, the communication interface 112 is a SCSI interface. The communication interface 112 may also be an IDE interface.

The communication interface 112 is coupled with a communication processor 114. The communication interface 112 may be coupled directly or indirectly with the communication processor 114. The communication interface 112 may be directly coupled with the communication processor 114, such that there are no intermediate components between the communication interface 112 and the communication processor 114. It is also possible that the communication interface 112 is coupled indirectly with the communication processor 114, such that the communication interface 112 communicates with the communication processor 114 through other components or systems.

The communication processor 114 of the system 102 may be configured to process demand requests received from the client 104 using communication interface 112. In one embodiment the communication processor 114 is a hardware-implemented processor, such as a processor implemented as a complex instruction set computer (CISC), as a processor implemented as a reduced instruction set computer (RISC), or as a combination thereof. In another embodiment, the communication processor 114 is a software-implemented processor written using a computer programming language such as C, Java, ASP.NET, in another computer programming language, or as a combination thereof. The communication processor 114 may be configured to facilitate communication between the components of the system 102, and between the components of the system 102 and the clients 104/106/108 in communication with the system 102.

When the system 102 receives a demand request from a client 104, the communication processor 114 may first process the demand request. The communication processor 114 may transmit the demand request to the resource requirement processor 116. In one embodiment, the resource requirement processor 116 is a hardware-implemented processor, such as a processor implemented as a complex instruction set computer (CISC), as a processor implemented as a reduced instruction set computer (RISC), or as a combination thereof. In another embodiment, the communication processor 114 is a software-implemented processor written using a computer programming language such as C, Java, ASP.NET, in another computer programming language, or as a combination thereof.

The resource requirement processor 116 may be configured to determine the resource requirements associated with the demand request. In one embodiment, the resource requirement processor 116 determines that one of the resource requirements is a technical skill requirement. For example, the resource requirement processor 116 may determine that a particular skill, such as being able to program in a programming language or being able to perform a complex job is required. In another embodiment, the resource requirement processor 116 determines that a resource requirement of the demand request is a travel availability requirement. For example, the resource requirement processor 116 may determine that being able to travel to another country is a requirement. The resource requirement processor 116 could also determine that being able to travel during a set period of time is required. In yet another embodiment, the resource requirement processor 116 determines that a resource requirement is a time availability requirement. For example, the resource requirement processor 116 may determine that a resource be available for specific set of time or duration, such as a period of days, weeks, months, or combination thereof. Other measurements of time are also possible.

After the resource requirement processor 116 has determined the requirements of the demand request received by the communication processor 114, the resource requirement processor 116 may then communicate with the resource selector 118 using the communication processor 114 to select resources that satisfy the requirements determined by the resource requirement processor 116. The resource selector 118 may be software stored in computer-readable memory on the system 102 and coupled with the communication processor 114. For example, the resource selector 118 may be written in a computer programming language, such as C, Java, or other programming language, and residing on a storage device, such as a hard drive, tape drive, or other storage device, and coupled with the communication processor 114. In another embodiment, the resource selector 118 may be implemented in hardware and coupled with the communication processor 114. For example, the resource selector 118 may be a processor implemented as a complex instruction set computer (CISC) or implemented as a reduced instruction set computer (RISC) to select the resources that satisfy the resource requirements of the demand request.

A shown in FIG. 1, the resource selector 118 is coupled with a resource database 120. In one embodiment, the resource database may be a software-implemented database that stores information associated with each of the resources available to the system 102. The resource database 120 may reside on the same system as the resource selector 118, or the resource database 120 may reside on another system coupled to the resource selector 102. For example the resources available to the system 102 may be human resources, such as workers, staff, or other employed persons, and the resource database 120 may store information associated with each of the employed persons. As another example, the resources available to the system 102 may be computer resources, such as software, hardware, or combinations thereof. In yet another example, the resources available to the system 102 may be general resources, including persons, places, or tools, that were previously catalogued and had information associated with them stored in the resource database 120.

In one embodiment, the information associated with the resources and stored by the resource database 120 may be personal information. For example, the resource database 120 may store information about the particular skill sets of a person, such as languages spoken, programming languages known, educational level, or other skill-related information. In another embodiment, the resource database 120 may store travel-related information about the resources. For example, travel-related information may include whether resources, such as employees, have passports or visas, have traveled outside a particular country or region, or are available to travel. Other travel-related information is also possible.

In yet another embodiment, the resource database 120 may store electrical information about the resources, if the resources satisfy electrical requirements. For example, the resources may be generators, and the resource database 120 may store information about how much output the generators produce. As yet another embodiment, the resource database 120 may store software-related information about the resources, if the resources satisfy software related requirements. For example, client 104 may need software that meets a particular need, such as a program that can act as a word processor. Other software-related information may include, but is not limited to, running a particular operating system, whether the resource can perform certain tasks, or whether the resource can behave in a desired fashion.

The resource database 120 may also store information representing a "locking prerequisite." A locking prerequisite may be a prerequisite that a client 104 has to satisfy before a resource will be hard-locked to a demand request. In one embodiment, the locking prerequisite may be a financial prerequisite. For example, the financial prerequisite may require that the client 104 pay a certain amount of money before the resource is allocated to the demand request of the client 104. In another embodiment, the locking prerequisite may be an availability prerequisite. For example, the availability prerequisite may require that the client 104 make available to the resource a desired thing, such as a visa, a particular piece of hardware, or a particular location. The availability prerequisite could also be a temporal prerequisite, such as that the client 104 may only reserve the resource for the demand request for a particular amount of time.

If the client 104 is able to satisfy the locking prerequisite, then the resource will be allocated to the demand request of the client 104 as a hard-locked allocation. A resource that is hard-locked to a demand request will not be assignable to a future demand request even if the resource is capable of satisfying the future demand request. However, if the client 104 is unable to satisfy the locking prerequisite, the resource may be assigned to the demand request of the client 104 as a soft-lock allocation. If a resource is assigned to a client 104 as a soft-lock allocation, the resource may be re-assignable to another demand request of another client 106 if the other client 106 is able to satisfy the locking prerequisite of the resource.

Managing resources is critical for a computer to function properly. A computer that does not properly manage resources may not be able to perform as many tasks or as efficiently as a similar computer that does manage resources properly. In some instances, the computer may ensure proper management of resources of another computer by using locking requirements. The computer may ensure that the other computer requesting the resource has the proper hardware available to utilize the resource. Without locking requirements, the other computer may be able to request and access a resource, and then without the proper hardware available to utilize the resource, the performance of the computer and the other computer would suffer because the resource would not be properly utilized. Therefore, locking requirements improve the performance of computers providing resources and computers accessing those resources.

After the resource selector 118 has received a set of resource requirements from the resource requirement processor 116, the resource selector 118 then queries the resource database 120. In one embodiment, the resource selector 118 queries the resource database 120 to receive a set of all available resources to the system 102. In another embodiment, the resource selector 118 queries the resource database 120 for a set of all resources accessible by the system 102, whether the resources are available or not. Availability may be determined based on whether the resource was previously allocated to another demand request or client, or availability may be based on whether the system 102 has access to the resource. For example, the resource selector 118 may query the demand request/resource allocation database 122 to determine which resources are currently allocated from the resources of the resource database 120.

After the resource selector 118 has received a set of available resources from the resource database 120, the resource selector 118 then selects the resources that satisfy the requirements determined by the resource requirement processor 116. For example, the resource selector 118 may filter the resources of the resource set sent by the resource database 120 based on the requirements determined by the resource requirement processor 116. In one embodiment, a requirement of the demand request might be that the resource be available to travel for a period of three weeks, in which case, the resource selector 118 would choose a resource that is available to travel for those three weeks. In another embodiment, the requirement of the demand request might be that a resource have a certain programming skill level, in which case the resource selector 118 would then choose a resource that satisfies the programming skill. It is also possible that the demand request has multiple requirements, in which case the resource selector 118 would then select the resource or resources that satisfy each of the requirements identified by the resource requirement processor 116. The resource selector 118 may also select multiple resources that satisfy the same resource requirement of the demand request.

After the resource selector 118 has selected the resource or resources that satisfy the requirements identified by the resource requirement processor 116, the resource selector 118 may then communicate with the resource allocation processor 124 to allocate the resources to a client 104. In one embodiment, the resource allocation processor is a processor implemented as a complex instruction set computer (CISC). In another embodiment, the resource allocation processor is a processor implemented as a reduced instruction set computer (RISC). It is also possible that the resource allocation processor 124 is implemented using a computer language, such as C, Java, or other programming language, or combination thereof. The resource allocation processor 124 may reside on the same system as the resource selector 118, or the resource allocation processor 124 may reside on another system.

To allocate a resource to a client 104, the resource allocation processor 124 may query the demand request/resource allocation database 122 to determine which resources are currently allocated from the resources of the resource set sent by the resource selector 118. In one embodiment, the resource allocations processor 124 may query the client 104 via the communication processor 114 to choose a resource for allocation. In another embodiment, the resource allocation processor 124 may choose a resource automatically for allocation. The resource allocation processor 124 may choose a resource that is not currently allocated from the resource set sent by the resource selector 118. If the resource allocation processor 124 chooses a resource that is not currently allocated from the resource set, the resource allocation processor 124 may communicate with the client 104 using the communication processor 114 to determine whether the client 104 can satisfy the locking prerequisite of the resource selected by the resource allocation processor 124. Once the resource allocation processor 124 has determined whether the client 104 can satisfy the locking prerequisite of the resource, the resource allocation processor 124 updates the demand request/resource allocation database 122 accordingly. In one embodiment, the resource allocation processor 124 may update or provide a locking identifier that identifies whether the resource allocated by the resource allocation processor 124 is allocated to the demand request as a soft-locked allocation or as a hard-locked allocation. The resource allocation processor 124 may also communicate with the resource database 120 or the demand request/resource allocation database 122 to update and/or modify either database.

Alternatively, resource allocation processor 124 may choose a resource that is currently allocated to another demand request. For example, the system 102 may have received a demand request from a client 106, and the resource chosen by the allocation processor 124 that satisfies the requirements of the demand request received from the client 106. However, the resource chosen by the resource allocation processor 124 may be currently allocated to the client 104. If the resource chosen by the resource allocation processor 124 satisfies the requirements of the demand request sent by the client 106, but the resource is currently allocated to the client 104, the system 102 may query the client 104 to satisfy the locking prerequisite of the resource soft-locked to the client 104. If the resource is soft-locked to the client 104, and the client 104 is unable to satisfy the locking prerequisite of the resource after being queried by the system 102, then the system 102 may query the other client 106 to satisfy the locking prerequisite.

Further shown in FIG. 1, is an input interface 126 and an output interface 128 coupled with the communication processor 114. The input interface 126 may be an audio interface, such as a microphone input, a tactile input interface, such as USB, an AT interface, a PS/2 interface, or a wireless interface, such as infrared, Bluetooth, are other radio transmission interface. Other input interfaces may also be possible. The output interface 128 may be a visual output interface, such as a DVI interface, a VGA interface, or other graphical interface. The output interface 128 may be an audio output interface, such as a stereo output interface or other audio output interface. Coupled to the input interface 126 is an input device 130. The input device 130 may be tactile input device, such as a keyboard, mouse, or other tactile input device, or the input device 130 may be an audio input device, such as a microphone, headset, or other audio input device. The output device 132 may be a visual output device, such as a CRT monitor, LCD monitor, or other visual output device. The output device 132 may also be an audio output device, such as stereo speakers or other audio output device.

A user may use the input device 130 to communicate with the resource requirement processor 116, the resource selector 118, or the resource allocation processor 124. A user may also use the input device 130 to communicate with the demand request/resource allocation database 122 or the resource database 120. For example, a user may manually modify the entries of the demand request/resource allocation database 122 or the entries of the resource database 120. Modification by a user may include creating, deleting, editing, or other modifications. The output device 132 may provide feedback to the user for commands the user provides to the system 102. The output device 132 may also provide feedback as to the results of allocating a resource to a demand request. For example, the output device 132 may provide feedback as to a successful allocation. The output device 132 could also provide feedback as to an unsuccessful allocation. Other types of feedback may also be possible.

Figure 2:
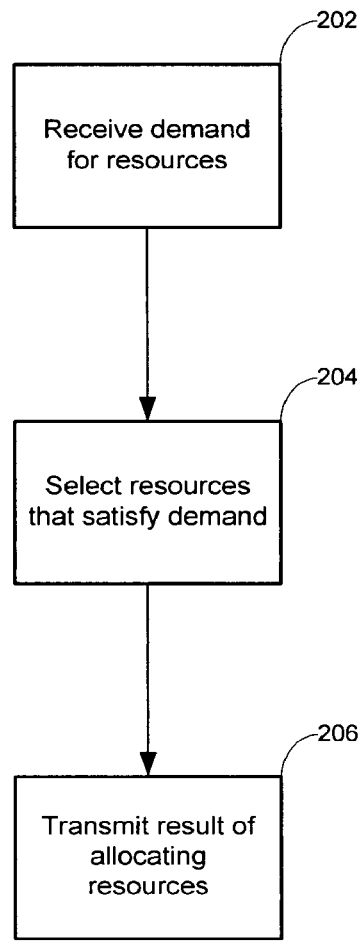
FIG. 2 is a flowchart of an example for allocating resources to a demand request.

FIG. 2 is a flowchart of an example for allocating resources to demand requests. As shown in FIG. 2 with reference to FIG. 1, a system 102 receives a demand for resources (Act 202). The demand for resources may be received as a demand request from a client 104. The system 102 then selects the resources that satisfy the demand request (Act 204). The system 102 then transmits results of allocating the selected resources (Act 206).

Figure 3:
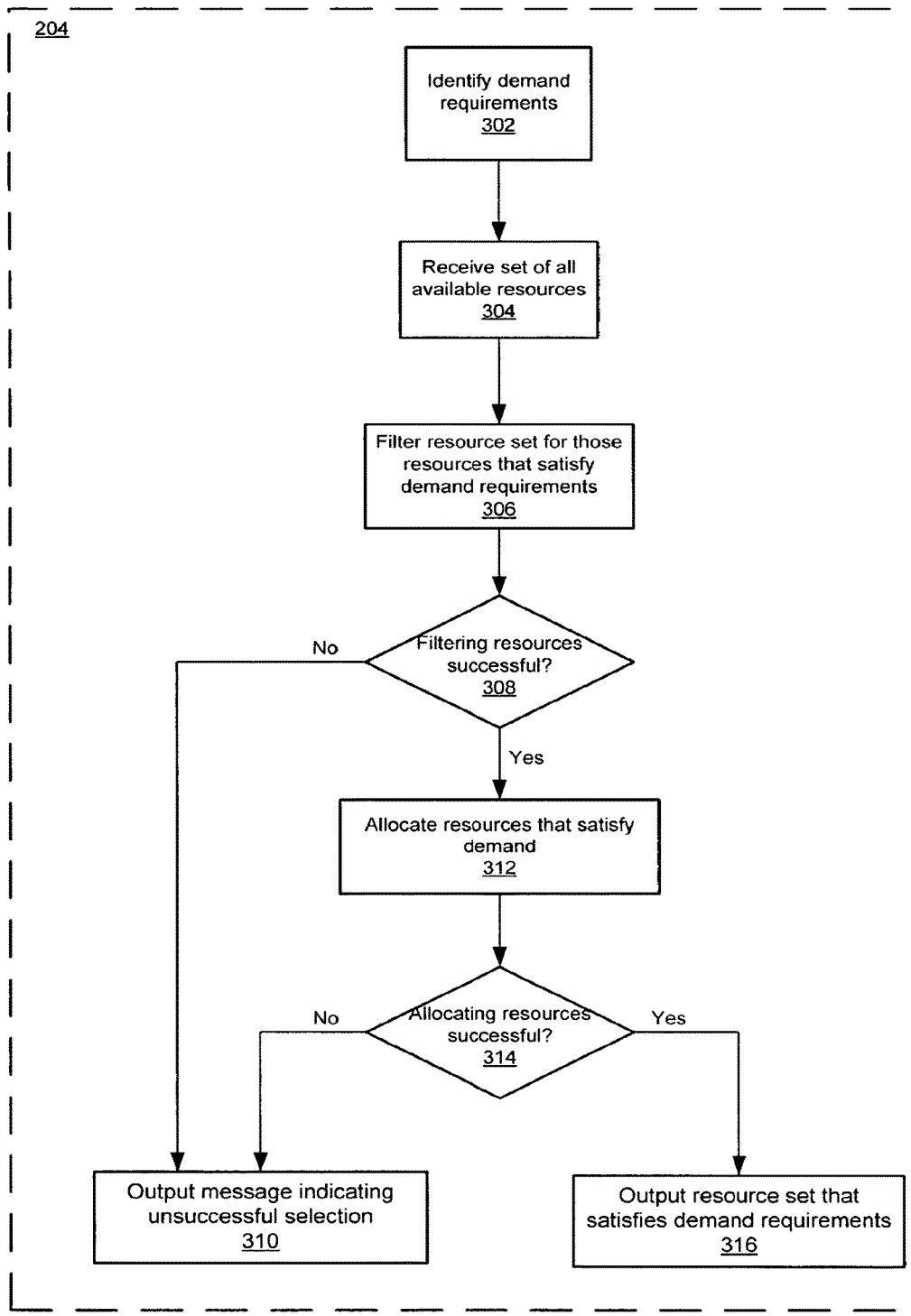
FIG. 3 is a flowchart of an example of selecting resources that satisfy the demand request received from FIG. 2.

FIG. 3 is a flowchart of an example of selecting resources to satisfy the resource requirements of the demand request. As shown in FIG. 3 with reference to FIG. 1, the system 102 identifies the resource requirements of the demand request (Act 302). The system 102 may use the resource requirement processor 116 to identify the resource requirements of the demand request. After the resource requirement processor 116 has determined the resource requirements of the demand request, the resource requirement processor 116 may communicate with the resource selector 118 via the communication processor 114 to select the resources that satisfy the resource requirements. In one embodiment, the resource selector 118 communicates with the resource database 120 to receive a set of all available resources (Act 304). The resource selector 118 may then filter the resource set received from the resource database 120 for those resources that satisfy the resource requirements of the demand request (Act 306).

As shown in FIG. 3 with reference to FIG. 1, the resource selector 118 determines whether the filtering of the resource set was successful (Act 308). For example, the resource selector 118 may determine whether any of the resources of the resource database 120 are able to satisfy the resource requirements of the demand request. In another embodiment, the resource selector 118 may determine whether a group of resources are able to satisfy the resource requirements of the demand request. If the resource selector 118 is unable to choose a resource or a group of resources that satisfy the resource requirements of the demand request, the resource selector 118 may employ branching logic to produce an error. For example, the resource selector 118 may communicate with the communication processor 114 to output a message indicating that there was an unsuccessful selection of resources (Act 310). The error message indicating an unsuccessful selection may be sent to the output device 132. The error message indicating an unsuccessful selection may also be sent to the client 104 of the demand request via the communication processor 114. Other actions other than sending an error message based on an unsuccessful selection may also be possible.

Alternatively, the resource selector 118 may determine that a resource or group of resources satisfies the resource requirements of the demand request. If the resource selector 118 makes this determination, the resource selector 118 then communicates with the resource allocation processor 114 to allocate the resource or resources that satisfy the resource requirements of the demand request (Act 312). The resource allocation processor 124 then proceeds to allocate the resource or resources selected by the resource selector 118. The resource allocation processor 124 may determine whether there was a successful allocation of resources (Act 314). If the resource allocation processor 124 determines that there was an unsuccessful allocation, the resource allocation processor 124 may send an error message to the communication processor 114. The communication processor 114 may send an error message indicating an unsuccessful allocation to the client 104 via the communication interface 112. The communication processor 114 may also send an error message indicating an unsuccessful allocation to the output device 132 via the output interface 128.

However, the resource allocation processor 124 could also send an output indicating a successful allocation of resources that satisfy the resource requirements of the demand request (Act 316). For example, the resource allocation processor 124 could send a message indicating a successful allocation to the communication processor 114. The communication processor 114 could then send a success message to the client 104 via the communication interface 112. The communication processor 114 could also send a success message to the output device 132 via the output interface 128. Referring back to FIG. 2, the system 102 could then transmit the result of allocating the resources by the resource allocation processor 124 (Act 206).

Figure 4A:
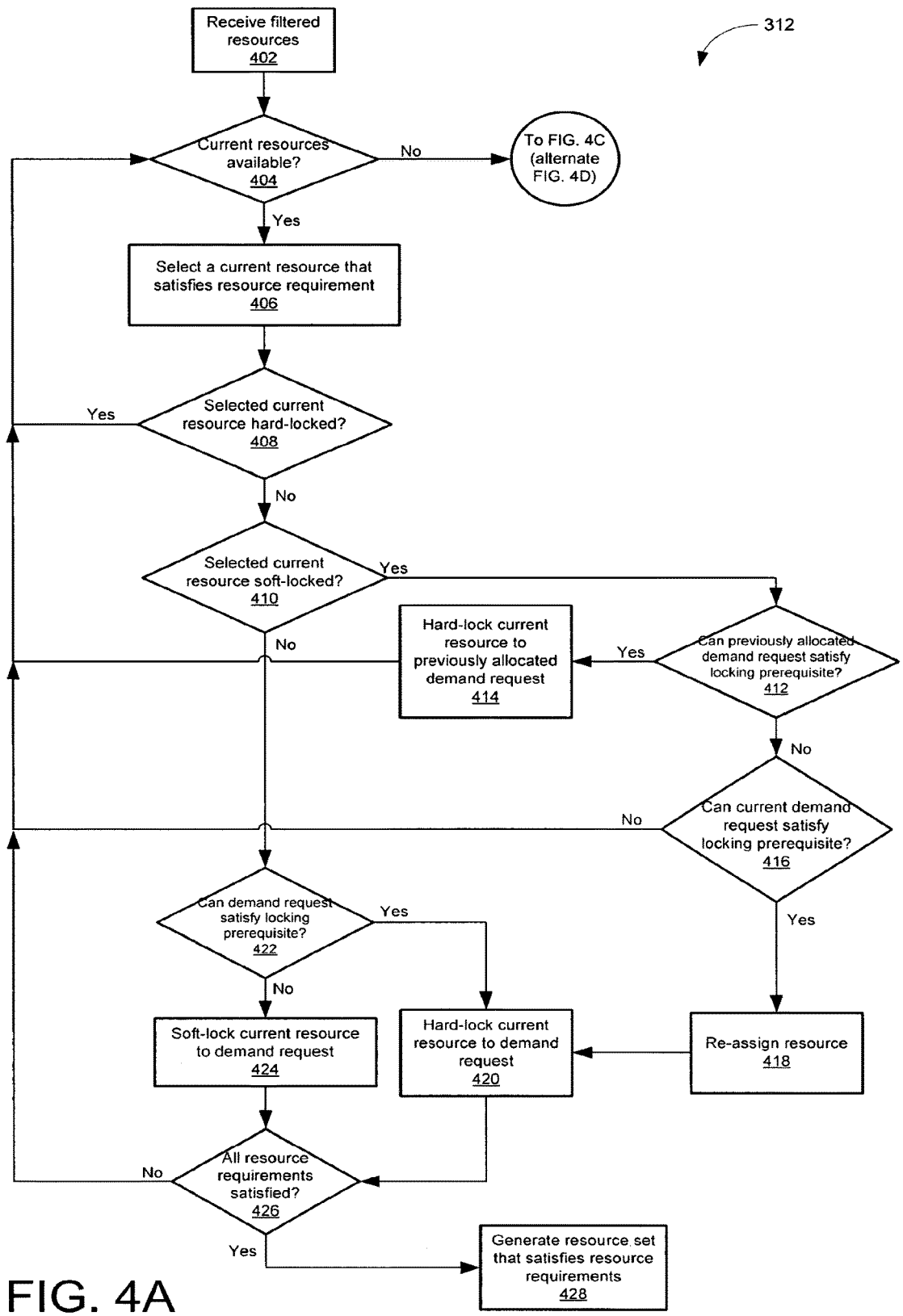
FIG. 4A is a flowchart of an example of allocating currently available resources to the demand request received from FIG. 2.

FIG. 4A is a flowchart of an example of allocating currently available resources to the demand request. As shown in FIG. 4A with reference to FIG. 1, the resource allocation processor 124 receives a filtered set of resources from the resource selector 118 (Act 402). The resource allocation processor 124 then queries the demand request/resource allocation database 122 to determine if there are current resources available to satisfy the resource requirements of the demand request (Act 404). If the resource allocation processor 124 determines that there are no current resources available, the resource allocation processor 124 may then query the demand request/resource allocation database to determine whether a future resource satisfies the resource requirements may become available. However, if the resource allocation processor 124 determines that a current resource is able to satisfy the resource requirements of the demand request, the resource allocation processor 124 selects a current resource satisfying the resource requirements of the demand request (Act 406).

After the resource allocation processor 124 has selected a current resource, resource allocation processor 124 determines whether the selected current resource is hard-locked (Act 408). For example, the resource allocation processor 124 may query the demand request/resource allocation database 122 to make this determination, such as by examining the locking identifier associated with the selected resource. The resource allocation processor 124 could also query the resource database 120 to make this determination. If the resource allocation processor 124 determines that the selected current resource is hard-locked, the resource allocation processor 124 may select another resource. However, if the resource allocation processor 124 determines that the selected current resource is not hard-locked, then the resource allocation processor 124 may determine whether the selected current resource is soft-locked (Act 410).

The resource allocation processor 124 may determine that the selected current resource is soft-locked. If the resource allocation processor 124 makes this determination, the resource allocation processor 124 may query the previously allocated demand request to satisfy the locking prerequisite of the selected current resource (Act 412). For example, the resource allocation processor 124 may communicate with the client of the previously allocated demand request via the communication processor 114 and communication link 110. In an alternative embodiment, the client may provide information that allows the resource allocation processor 124 to automatically determine whether the client of the previously allocated demand request can satisfy the locking prerequisite of the selected current resource. If the client of the previously allocated demand request can satisfy the locking prerequisite of the selected current resource, the resource allocation processor 124 may hard-lock the current resource to the previously allocated demand request (Act 414). For example, the resource allocation processor 124 may assign a locking identifier that identifies the selected current resource as hard-locked to the previously allocated demand request. The resource allocation processor 124 may then proceed to allocate another current resource (Act 404).

The client of the previous demand request may not be able to satisfy the locking prerequisite of the selected current resource. If the client of the previous demand request is unable to satisfy the locking prerequisite, the resource allocation processor 124 may query the client of the current demand request to satisfy the locking prerequisite (Act 416). If the client of the current demand request is unable to satisfy the locking prerequisite of the soft-locked current resource, the resource allocation processor 124 may proceed to allocate another current resource (Act 404). If however, the client of the current demand request can satisfy the locking prerequisite of the current resource, the resource allocation processor 124 may proceed to reassign the selected current resource to the client of the current demand request (Act 418). For example, the resource allocation processor 124 may remove the soft-locked locking identifier associated with the selected current resource and the previously allocated demand request. The resource allocation processor 124 then hard-locks the selected current resource to the current demand request (Act 420), such as by assigning a hard-locked locking identifier to the selected current resource in the demand request/resource allocation database 122.

Alternatively, the resource allocation processor 124 may determine that the selected current resource is not soft-locked (Act 410). If the resource allocation processor 124 determines that the selected current resource is not soft-locked, the resource allocation processor 124 may query the client of the current demand request to satisfy the locking prerequisite of the selected current resource (Act 422). In an alternative embodiment, the resource allocation processor 124 may not query the client of the current demand request, such as where the client has previously provided information as to whether the client can satisfy the locking prerequisite of the resources of the system 102. If the client of the current demand request is able to satisfy the locking prerequisite of the selected current resource, the resource allocation processor 124 may then hard-lock the selected current resource to the current demand request (Act 420). The resource allocation processor 124 then proceeds to determine whether the resource requirements of the demand request have been satisfied (Act 426).

If the client of the current demand request is unable to satisfy the locking prerequisite of the selected current resource, the resource allocation processor 124 may then soft-lock the selected current resource to the current demand request (Act 424). For example, the resource allocation processor 124 may assign a soft-lock locking identifier to the current resource and update the demand request/resource allocation database 122 accordingly. After the resource allocation processor 124 has assigned a soft-locked locking identifier to the selected current resource, the resource allocation processor 124 then proceeds to determine whether the resource requirements of the demand request has been satisfied (Act 426).

In one embodiment, the resource allocation processor 124 may compare the information associated with the selected current resource stored by the resource database 120 with the resource requirements of the current demand request. If the resource allocation processor 124 determines that not all of the resource requirements of the demand request are satisfied, the resource allocation processor 124 may proceed to allocate another current resource (Act 404). It is also possible that the resource allocation processor 124 proceeds to select a later available future resource to satisfy the resource requirements of the current demand request (See FIG. 4C).

If the resource allocation processor 124 determines that the resource requirements of the current demand request are satisfied, the resource allocation processor 124 then proceeds to generate a resource set of the resources that have satisfied the resource requirements of the demand request (Act 428). In another embodiment, the resource allocation processor 124 may allow the client of the current demand request to select specific resources if more than one resource satisfies the resource requirements of the demand request.

Figure 4B:
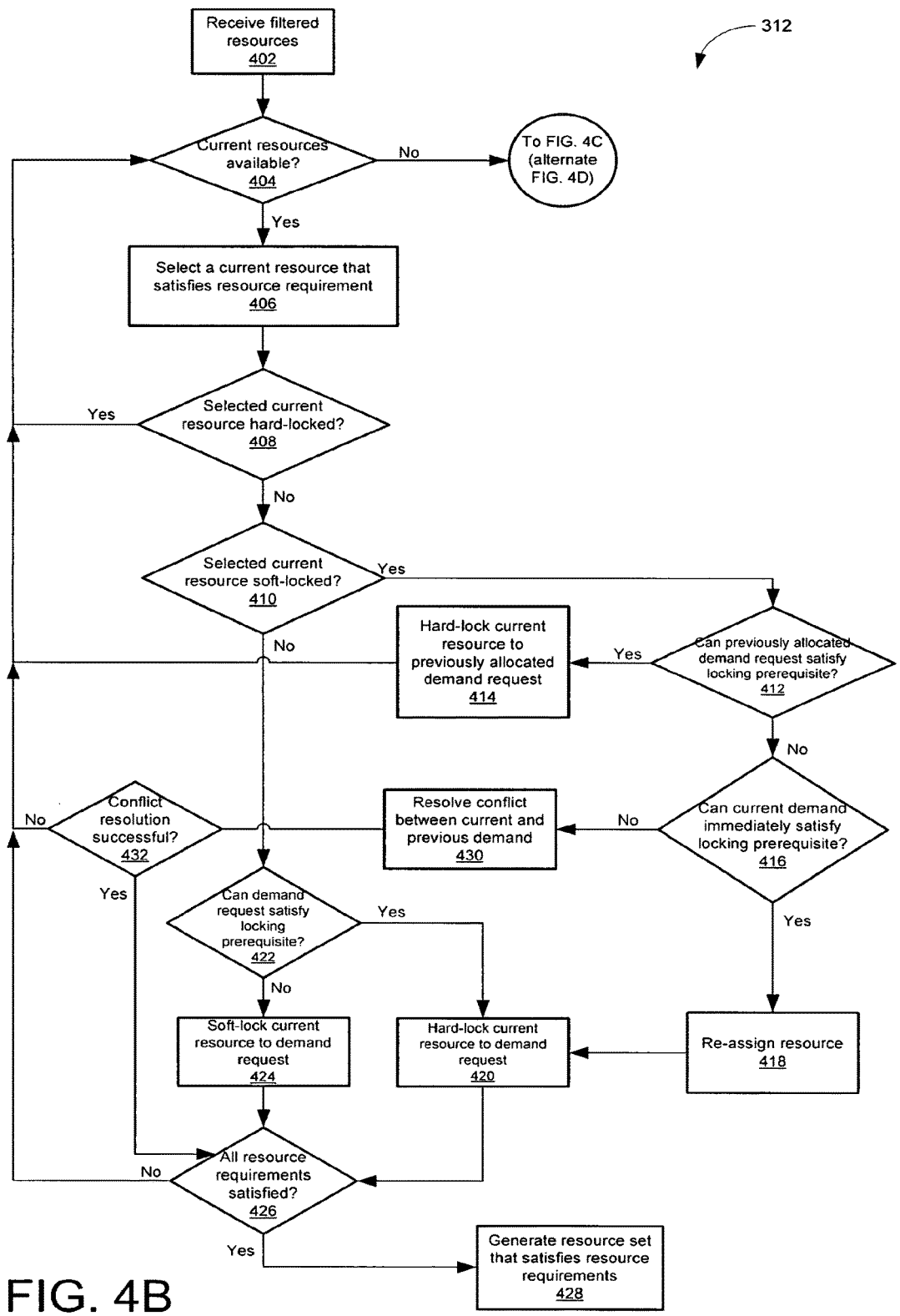
FIG. 4B is a flowchart of an alternative example of allocating currently available resources to the demand request received from FIG. 2.

FIG. 4B is a flowchart of an alternative example of allocating a current resource or resources to a current demand request. In this alternative example and with reference to FIG. 1, the resource allocation processor 124 may proceed to conflict resolution (Act 430) if the client of the current demand request cannot satisfy the locking prerequisite of the selected current resource (Act 416). In one embodiment, the resource allocation processor 124 may take into account the resource requirements of the current demand and the resource requirements of the previous demand. Based on the comparison analysis, the resource allocation processor 124 may determine whether the current resource should be allocated as a soft-locked allocation to the current demand or whether the current resource should be allocated as a soft-locked allocation to the previous demand. For example, the resource allocation processor 124 may determine that the current demand request has a higher priority than the previous demand request. In another example, the resource allocation processor 124 may determine that the current demand request has less resource requirements than the previous demand request. Other types of conflict resolutions are also possible.

After performing conflict resolution between the current demand request and the previous demand request, the resource allocation processor 124 then determines whether the conflict resolution was successful (Act 432). In one embodiment, the resource allocation processor 124 may send a conflict resolution message to the communications processor 114. The communication processor 114 may then send this conflict resolution message to the client of the current demand request and/or the client of the previous demand request. The communication processor 114 could also send the conflict resolution message to the output device 132 via the output interface 120.

If the resource allocation processor 124 determines that the conflict resolution was not successful such that the selected current resource should remain soft-locked to the previous demand request, the resource allocation processor 124 may then proceed to select another current resource (Act 404). If the resource allocation processor 124 determines that the conflict resolution was successful, such as where the selected current resource should be reallocated to the current demand request as a soft-locked allocation, the resource allocation processor 124 then proceeds to determine whether the resource requirements of the current demand request were satisfied (Act 426). If the resource allocation processor 124 determines that the resource requirements of the current demand request are satisfied, the resource allocation processor 124 then proceeds to generate a resource set of resources that satisfy the resource requirements (Act 428). However, if the resource allocation processor 124 determines that the resource requirements were not satisfied, the resource allocation processor 124 may then proceed to select another current resource (Act 404). In one embodiment, if the resource allocation processor 124 determines that there are no current resources available (Act 404), the resource allocation processor 124 may then proceed to select future resources that may become available that satisfy the resource requirements of the current demand request.

Figure 4C:
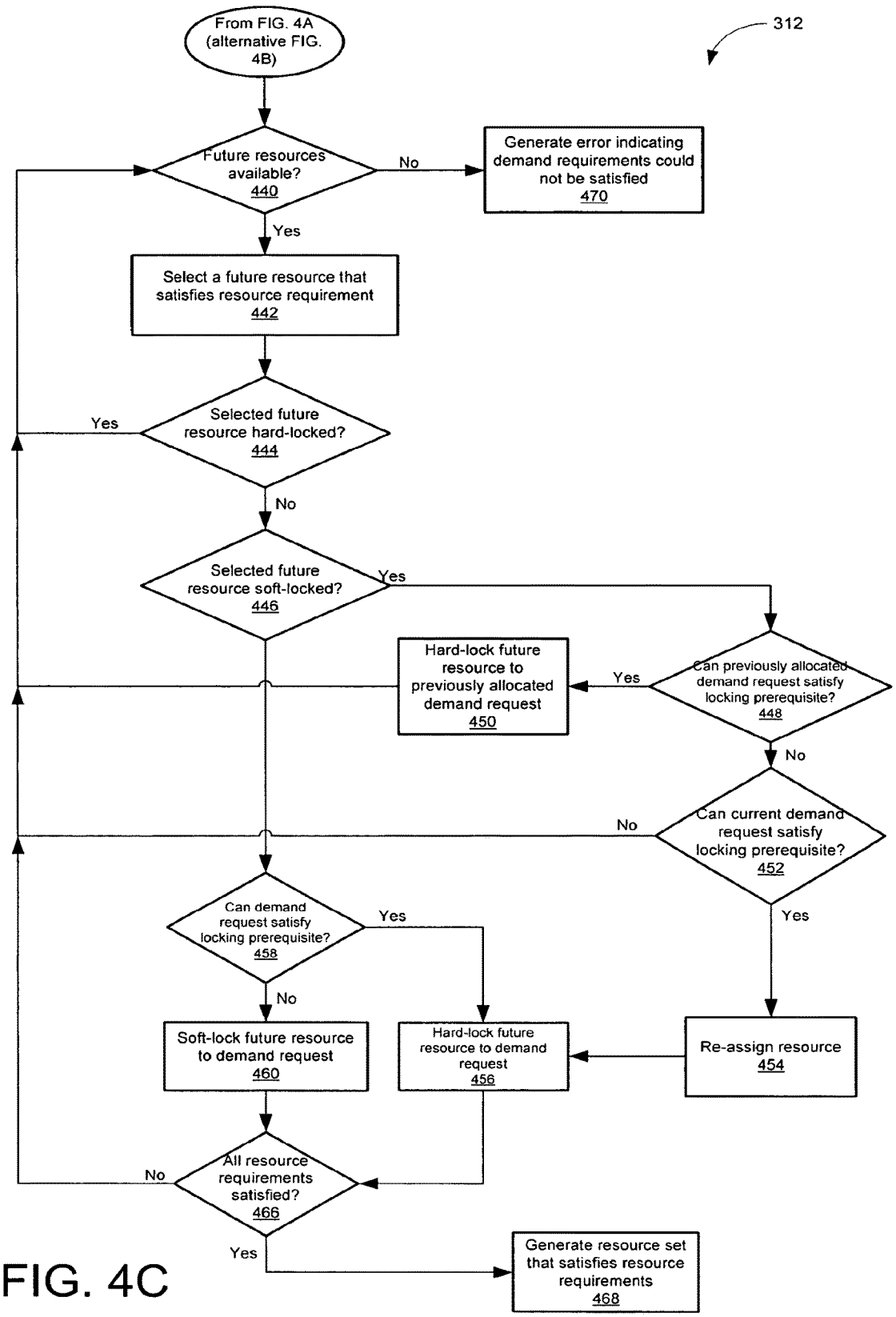
FIG. 4C is a flowchart of an example of allocating future resources to the demand request received from FIG. 2.

FIG. 4C is a flowchart of an example of allocating future resources to a demand request continuing from FIG. 4A, or alternatively, FIG. 4B. Referring again to FIG. 1, in one embodiment, the resource selector 118 may query the demand request/resource allocation database 122 to select future resources that may become available that satisfy the demand requirements of the received demand request. Based on the future resources selected by the resource selector 118, the resource allocation processor 124 would then proceed to allocate future resources to the demand request in conjunction with, or alternatively to, allocating current resources to the demand request. As shown in FIG. 4C and with reference to FIG. 1, the resource allocation processor 124 determines whether there will be future resources available (Act 440). For example, the resource allocation processor 124 may query the demand request/resource allocation database 122 based on the list of resources communicated by the resource selector 118 to determine whether a future resource may become available at a future time. If the resource allocation processor 124 determines that there are no future resources available (Act 440), the resource allocation processor 124 may generate an error indicating that the resource requirements cannot be satisfied (Act 470). This error message could be communicated to the client of the current demand request via the communication processor 114. This error message could also be communicated to the output device 132 via the communication processor 114.

Alternatively, the resource allocation processor 124 could determine that a future resource will become available. In this case, the resource allocation processor 124 selects a future resource that satisfies a resource requirement or resource requirements of the demand request (Act 442). The resource allocation processor 124 then proceeds to determine whether the selected future resource is hard-locked (Act 444). If the resource allocation processor 124 determines that the selected future resource is hard-locked, the resource allocation processor 124 may then proceed to determine whether another future resource is available (Act 440).

However, if the resource allocation processor 124 determines that the selected future resource is not hard-locked, then the resource allocation processor 124 may determine whether the selected future resource is soft-locked (Act 446). The resource allocation processor 124 may determine that the selected future resource is soft-locked. If the resource allocation processor 124 makes this determination, the resource allocation processor 124 may query the previously allocated demand request to satisfy the locking prerequisite of the selected future resource (Act 448). If the client of the previous allocated demand request can satisfy the locking prerequisite of the selected future resource, the resource allocation processor 124 may hard-lock the future resource to the previously allocated demand request (Act 450). The resource allocation processor 124 may then proceed to allocate another future resource (Act 440).

The client of the previous demand request may not be able to satisfy the locking prerequisite of the selected future resource. If the client of the previous demand request is unable to satisfy the locking prerequisite, the resource allocation processor 124 may query the client of the current demand request to satisfy the locking prerequisite (Act 452). If the client of the current demand request is unable to satisfy the locking prerequisite of the soft-locked future resource, the resource allocation processor 124 may then proceed to allocate another future resource (Act 440). If however, the client of the current demand request is able to satisfy the locking prerequisite of the future resource, the resource allocation processor 124 may then proceed to reassign the selected future resource to the client of the current demand request (Act 454). The resource allocation processor 124 then hard-locks the selected future resource to the current demand request (Act 456).

Alternatively, the resource allocation processor 124 may determine that the selected future resource is not soft-locked (Act 446). If the resource allocation processor 124 determines that the selected future resource is not soft-locked, the resource allocation processor 124 may query the client of the current demand request to satisfy the locking prerequisite of the selected future resource (Act 458). In an alternative embodiment, the resource allocation processor 124 may not have to query the client of the current demand request, such as where the client has previously provided information as to whether the client can satisfy the locking prerequisite of the resources of the system 102. If the client of the current demand request is able to satisfy the locking prerequisite of the selected future resource, the resource allocation processor 124 may then hard-lock the selected future resource to the current demand request (Act 456). The resource allocation processor 124 then proceeds to determine whether the resource requirements of the demand request have been satisfied (Act 466).

If the client of the current demand request is unable to satisfy the locking prerequisite of the selected future resource, the resource allocation processor 124 may then soft-lock the selected future resource to the current demand request (Act 460). The resource allocation processor 124 then proceeds to determine whether the resource requirements of the demand request have been satisfied (Act 466).

In one embodiment, the resource allocation processor 124 may compare the information associated with the selected future resource stored by the resource database 120 with the resource requirements of the current demand request. If the resource allocation processor 124 determines that not all of the resource requirements of the demand request are satisfied, the resource allocation processor 124 may proceed to allocate another future resource (Act 440).

If the resource allocation processor 124 determines that the resource requirements of the current demand request are satisfied, the resource allocation processor 124 then proceeds to generate a resource set of the resources that satisfy the resource requirements of the demand request (Act 468). The generated resource set may include future resources that will become available, current resources that are available, or a combination thereof. In another embodiment, the resource allocation processor 124 may allow the client of the current demand request to select specific resources if more than one resource satisfies the resource requirements of the demand request.

Figure 4D:
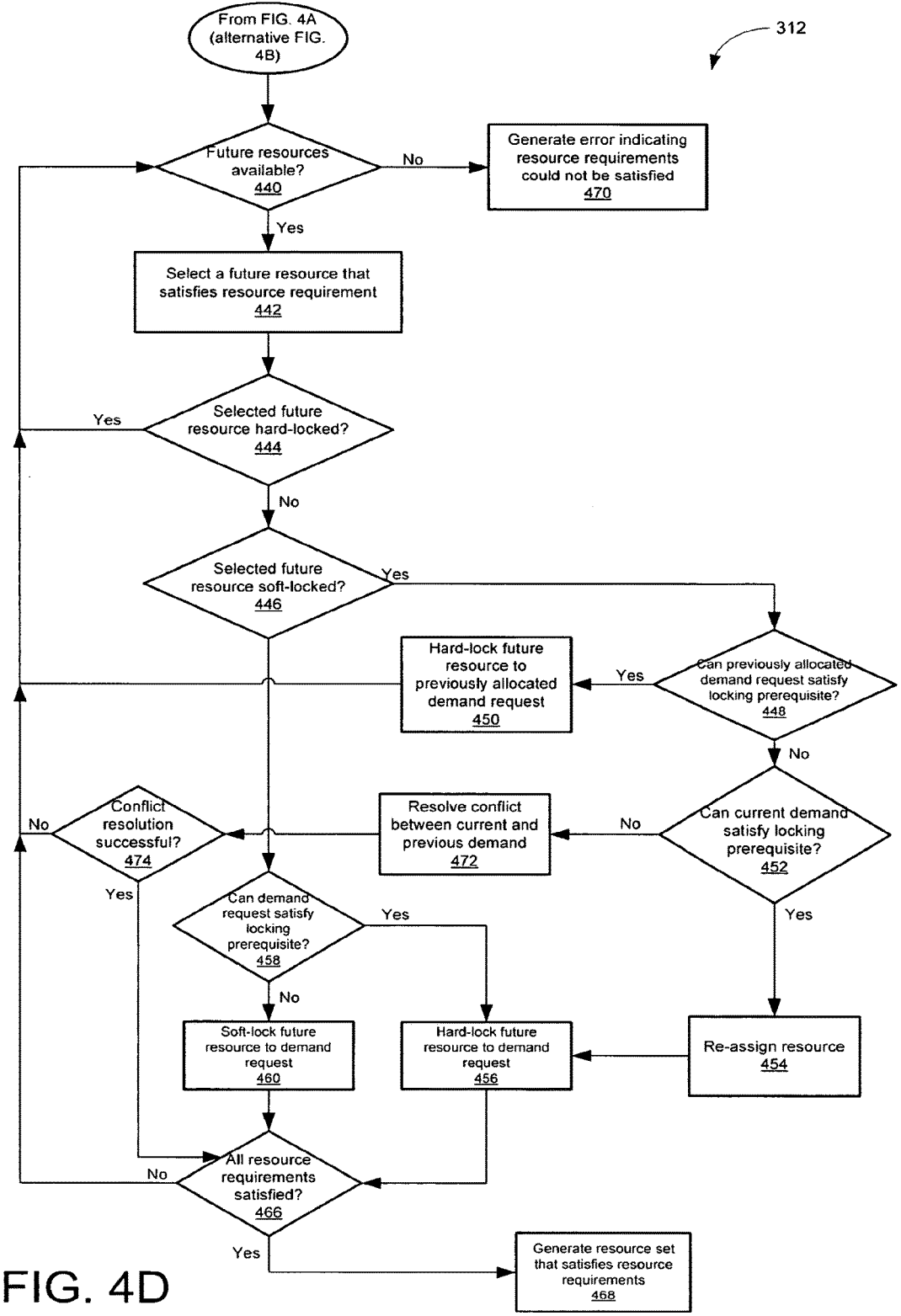
FIG. 4D is a flowchart of an alternative example of allocating future resources to the demand request received from FIG. 2.

FIG. 4D is a flowchart of an alternative example of allocating a future resource or resources to a current demand request. With reference to FIG. 1, in this alternative example of FIG. 4D, the resource allocation processor 124 may proceed to conflict resolution (Act 472) if the client of the current demand request cannot satisfy the locking prerequisite of the selected future resource (Act 453). In one embodiment, the resource allocation processor 124 may take into account the resource requirements of the current demand and the resource requirements of the previous demand. Based on the comparison analysis, the resource allocation processor 124 may determine whether the future resource should be allocated as a soft-locked allocation to the current demand or whether the future resource should be allocated as a soft-locked allocation to the previous demand. For example, the resource allocation processor 124 may determine that the current demand request has a higher priority than the previous demand request. In another example, the resource allocation processor 124 may determine that the current demand request has less resource requirements than the previous demand request. Other types of conflict resolutions are also possible.

After performing conflict resolution between the current demand request and the previous demand request, the resource allocation processor 124 then determines whether the conflict resolution was successful (Act 474). In one embodiment, the resource allocation processor 124 may send a conflict resolution message to the communications processor 114. The communication processor 114 may then send this conflict resolution message to the client of the current demand request and/or the client of the previous demand request. The communication processor 114 could also send the conflict resolution message to the output device 132 via the output interface 120. If the resource allocation processor 124 determines that the conflict resolution was not successful such that the selected future resource should remain soft-locked to the previous demand request, the resource allocation processor 124 may then proceed to select another future resource (Act 440). If the resource allocation processor 124 determines that the conflict resolution was successful, such as where the selected future resource should be reallocated to the current demand request as a soft-locked allocation, the resource allocation processor 124 then proceeds to determine whether the resource requirements of the current demand request were satisfied (Act 466). If the resource allocation processor 124 determines that the resource requirements of the current demand request are satisfied, the resource allocation processor 124 then proceeds to generate a resource set of the resources that satisfied the resource requirements (Act 468). However, if the resource allocation processor 124 determines that not all of the resource requirements were satisfied, the resource allocation processor 124 may then proceed to select another future resource (Act 440).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer-implemented method comprising:
    receiving, from a client device and by a communication processor of a resource assignment system that includes (i) the communication processor, (ii) a resource requirement processor, and (iii) a resource allocation processor, a request that is associated with a purchase of an output of a resource, wherein the resource allocation processor is configured to determine whether the client device includes a particular piece of hardware associated with the resource;
    in response to the request, determining, by the resource requirement processor of the resource assignment system, that the resource satisfies a demand requirement of the request;
    in response to determining that the resource satisfies a demand requirement of the request, determining, by the resource allocation processor of the resource assignment system, that the resource is scheduled to fulfill another request from another client device;
    determining, by the resource requirement processor of the resource assignment system, that the other client device does not include the particular piece of hardware for the resource to satisfy the demand requirement of the request and the client device does include the particular piece of hardware for the resource to satisfy the demand requirement of the request; and
    in response to determining that the other client device does not include the particular piece of hardware for the resource to satisfy the demand requirement of the request and the client device does include the particular piece of hardware for the resource to satisfy the demand requirement of the request:
        preventing, by the resource allocation processor of the resource assignment system, the resource from fulfilling the request from the other client device, and
        scheduling, by the resource allocation processor of the resource assignment system, the resource to fulfill the request from the client device.

2. The method of claim 1, wherein the demand requirement describes the output to be purchased.

3. The method of claim 1, wherein determining that the resource satisfies a demand requirement of the request comprises:
   determining that the resource comprises a generator that generates the output to be purchased.

4. The method of claim 1, wherein determining that the resource satisfies a demand requirement of the request comprises:
   determining the demand requirement of the request;
   identifying a set of resources including the resource; and
   determining, from the set of resources, the resource satisfies the demand requirement of the request.

5. The method of claim 1, wherein determining that the resource is scheduled to fulfill another request from another client device comprises:
   determining that the resource is scheduled to provide an output to the other client device.

6. The method of claim 1, comprising:
   determining that the other client device has not paid for the output of the resource,
   wherein preventing the resource from fulfilling the request from the other client device is based on determining that the other client device has not paid for the output of the resource.

7. The method of claim 1, comprising:
   determining that the client device can pay for the output of the resource,
   wherein scheduling the resource to fulfill the request from the client device is based on determining that the client device can pay for the output of the resource.

8. The method of claim 1, wherein scheduling the resource to fulfill the request from the client device comprises:
   requesting payment for the output of the resource from the client device;
   receiving payment from the client device; and
   in response to receiving payment from the client device, scheduling the resource to fulfill the request from the client device.

9. The method of claim 1, in response to scheduling the resource to fulfill the request from the client device, providing an indication to the client device that the client device has purchased the output.

10. The method of claim 1, in response to the request, determining that the resource satisfies a demand requirement of the request comprises:
    determining that multiple resources satisfy the demand requirement; and
    receiving a selection by the client device of the resource to provide the output from among the multiple resources that satisfy the demand requirement.

11. The method of claim 1, wherein resource is software that uses the particular piece of hardware to satisfy the demand requirement of the request.

12. A system comprising:
    one or more computers and one or more storage devices storing instructions that are operable, when executed by the one or more computers, to cause the one or more computers to perform operations comprising:
       receiving, from a client device and by a communication processor of a resource assignment system that includes (i) the communication processor, (ii) a resource requirement processor, and (iii) a resource allocation processor, a request that is associated with a purchase of an output of a resource, wherein the resource allocation processor is configured to determine whether the client device includes a particular piece of hardware associated with the resource;
       in response to the request, determining, by the resource requirement processor of the resource assignment system, that the resource satisfies a demand requirement of the request;
       in response to determining that the resource satisfies a demand requirement of the request, determining, by the resource allocation processor of the resource assignment system, that the resource is scheduled to fulfill another request from another client device;
       determining, by the resource requirement processor of the resource assignment system, that the other client device does not include the particular piece of hardware for the resource to satisfy the demand requirement of the request and the client device does include the particular piece of hardware for the resource to satisfy the demand requirement of the request; and
       in response to determining that the other client device does not include the particular piece of hardware for the resource to satisfy the demand requirement of the request and the client device does include the particular piece of hardware for the resource to satisfy the demand requirement of the request:
          preventing, by the resource allocation processor of the resource assignment system, the resource from fulfilling the request from the other client device, and
          scheduling, by the resource allocation processor of the resource assignment system, the resource to fulfill the request from the client device.

13. The system of claim 12, wherein the demand requirement describes the output to be purchased.

14. The system of claim 12, wherein determining that the resource satisfies a demand requirement of the request comprises:
    determining that the resource comprises a generator that generates the output to be purchased.

15. The system of claim 12, wherein determining that the resource satisfies a demand requirement of the request comprises:
    determining the demand requirement of the request;
    identifying a set of resources including the resource; and
    determining, from the set of resources, the resource satisfies the demand requirement of the request.

16. The system of claim 12, wherein determining that the resource is scheduled to fulfill another request from another client device comprises:
    determining that the resource is scheduled to provide an output to the other client device.

17. The system of claim 12, comprising:
    determining that the other client device has not paid for the output of the resource,
    wherein preventing the resource from fulfilling the request from the other client device is based on determining that the other client device has not paid for the output of the resource.

18. The system of claim 12, comprising:
    determining that the client device can pay for the output of the resource,
    wherein scheduling the resource to fulfill the request from the client device is based on determining that the client device can pay for the output of the resource.

19. The system of claim 12, wherein scheduling the resource to fulfill the request from the client device comprises:

requesting payment for the output of the resource from the client device;

receiving payment from the client device; and in response to receiving payment from the client device, scheduling the resource to fulfill the request from the client device.

20. The system of claim 12, in response to scheduling the resource to fulfill the request from the client device, providing an indication to the client device that the client device has purchased the output.

21. A non-transitory computer-readable medium storing software comprising instructions executable by one or more computers which, upon such execution, cause the one or more computers to perform operations comprising:

receiving, from a client device and by a communication processor of a resource assignment system that includes (i) the communication processor, (ii) a resource requirement processor, and (iii) a resource allocation processor, a request that is associated with a purchase of an output of a resource, wherein the resource allocation processor is configured to determine whether the client device includes a particular piece of hardware associated with the resource;

in response to the request, determining, by the resource requirement processor of the resource assignment system, that the resource satisfies a demand requirement of the request;

in response to determining that the resource satisfies a demand requirement of the request, determining, by the resource allocation processor of the resource assignment system, that the resource is scheduled to fulfill another request from another client device;

determining, by the resource requirement processor of the resource assignment system, that the other client device does not include the particular piece of hardware for the resource to satisfy the demand requirement of the request and the client device does include the particular piece of hardware for the resource to satisfy the demand requirement of the request; and in response to determining that the other client device does not include the particular piece of hardware for the resource to satisfy the demand requirement of the request and the client device does include the particular piece of hardware for the resource to satisfy the demand requirement of the request:

preventing, by the resource allocation processor of the resource assignment system, the resource from fulfilling the request from the other client device, and scheduling, by the resource allocation processor of the resource assignment system, the resource to fulfill the request from the client device.

* * * * *